Nov. 25, 1924.
G. F. MOORS
1,517,090
PACKING RING
Filed July 1, 1921
2 Sheets-Sheet 1
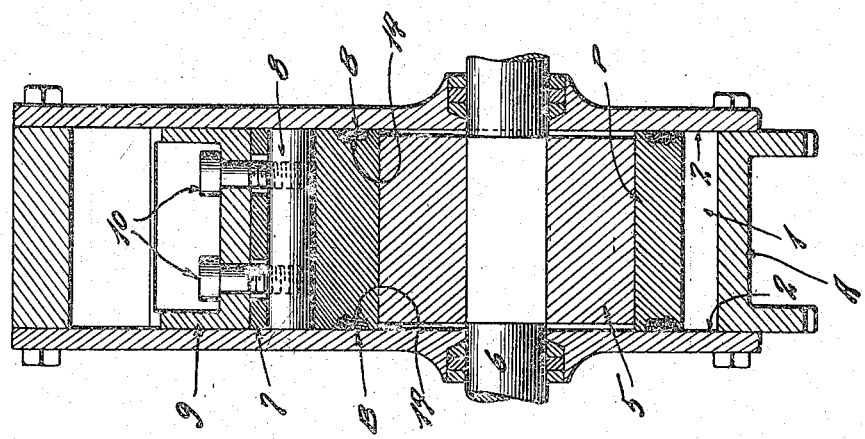
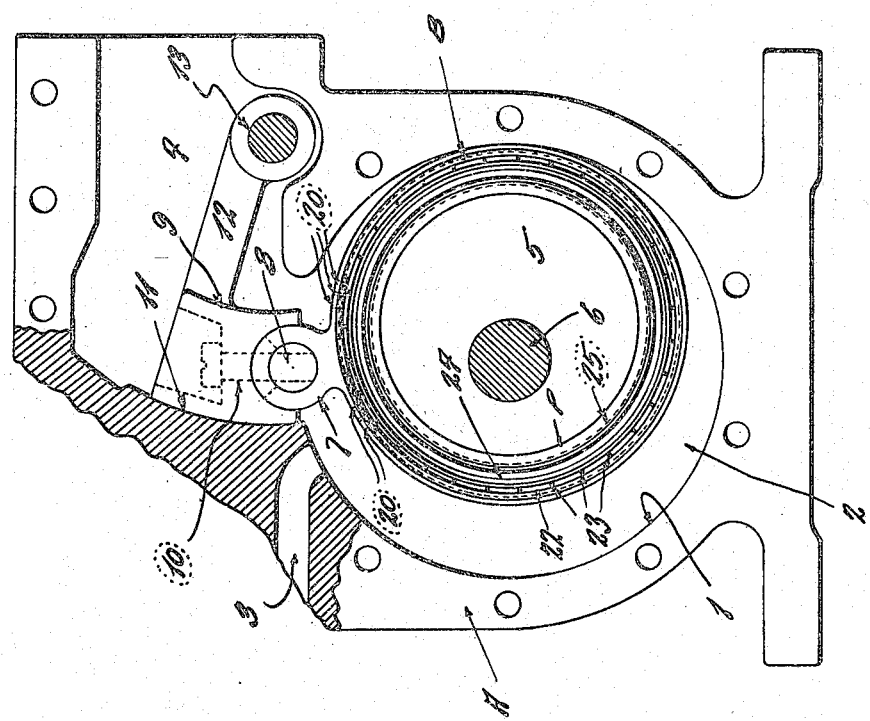
Inventor
Geo. F. Moors
by Cook & McCauley Attys.

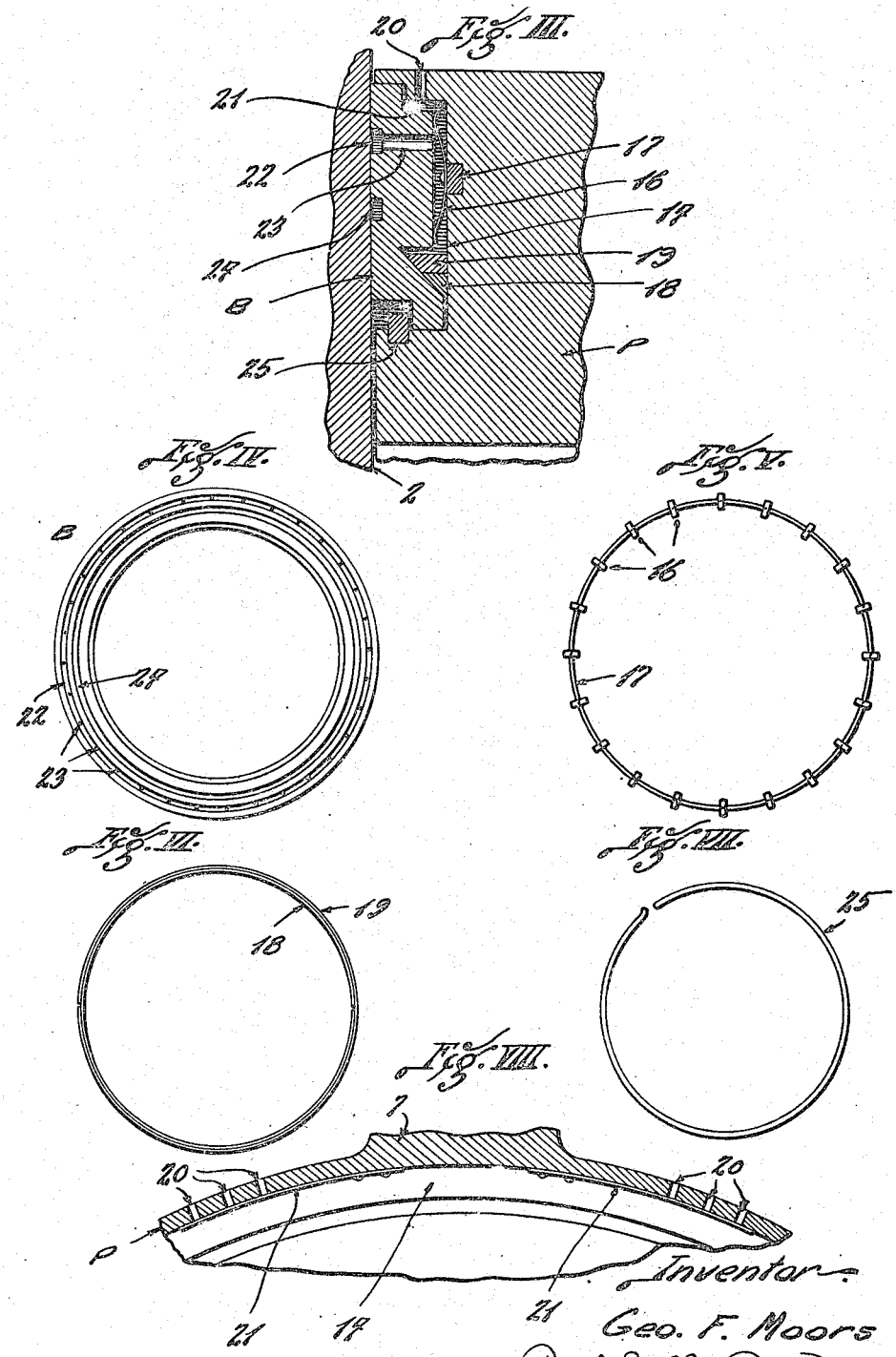

Patented Nov. 25, 1924.

1,517,090

UNITED STATES PATENT OFFICE.

GEORGE F. MOORS, OF WEBSTER GROVES, MISSOURI, ASSIGNOR TO THE RECIP-ROTO ENGINE COMPANY, OF ST. LOUIS, MISSOURI, A CORPORATION OF DELAWARE.

PACKING RING.

Application filed July 1, 1921. Serial No. 481,768.

*To all whom it may concern:*

Be it known that I, GEORGE F. MOORS, a citizen of the United States of America, a resident of Webster Groves, in the county of St. Louis, State of Missouri, have invented certain new and useful Improvements in Packing Rings, of which the following is a full, clear, and exact description, reference being had to the accompanying drawings, forming a part of this invention.

This invention relates to improvements in packing rings adapted for use in rotary engines of the type shown in Patent No. 1,227,173, granted May 22, 1917, although it is to be understood that the present invention is not limited to such use. The main object is to produce a simple and effective packing ring.

A further object is to produce a packing ring having its elements so combined with each other that the fluid pressure tending to escape across one side of the ring is approximately balanced by fluid pressure at the other side of the ring. Another object is to produce an effective means for sealing a balanced ring of this kind, so as to prevent leakage of the fluid pressure whereby the ring is balanced.

Another object is to provide a sectional packing ring including an endless ring member and a resilient sealing ring member cooperating therewith to prevent escape of fluid from a pressure chamber.

A further object is to produce a sectional packing ring having a plurality of ring members including a resilient ring member in the form of an annular wedge exposed to the fluid pressure in such a manner that the fluid pressure on the wedge tends to seat the ring members.

More specifically stated, an object is to produce a packing ring adapted to form a most effective seal between the side of a piston and a flat side face of a cylinder. A packing ring of this kind must be subjected to lateral pressure to engage it with its seats, and this involves problems not found in the designing of simple expanding rings for the pistons of ordinary reciprocating engines. The specific structure I have shown includes an endless ring mounted in the piston of a rotary engine and frictionally engaging a flat inner face of the cylinder. Obviously, it is an advantage to use a ring of this kind having no separated ends. A resilient ring engages the endless ring to force the latter onto the flat face of the cylinder, and this sealing ring is in the form of a wedge subjected to the fluid pressure in such a manner that the pressure tends to force both rings onto their seats.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a vertical section, partly in elevation, showing certain parts of a rotary engine provided with a packing ring embodying the features of this invention.

Fig. II is a vertical section of the engine shown in Fig. I.

Fig. III is an enlarged fragmentary view showing a portion of a flat cylinder wall, with a packing ring interposed between the piston and cylinder.

Fig. IV is a detail view of the endless packing ring member.

Fig. V is a detail view showing the springs whereby the endless ring member is forced toward the flat face of the cylinder.

Fig. VI is a detail view of the double packing ring member which cooperates with the endless ring member.

Fig. VII is a detail view of the retaining ring whereby the sectional packing ring is retained in the piston.

Fig. VIII is an enlarged fragmentary view of a portion of the piston showing the ports through which fluid under pressure may be admitted to the groove in which the packing ring is mounted and also showing the valve elements adapted to close said ports.

To illustrate the invention, I have shown a rotary engine comprising a pressure chamber A having a circular inner face 1 and flat side faces 2. This cylinder is provided with an inlet passageway 3 and a discharge passageway 4. I do not deem it necessary to show the valves for controlling the admission and discharge of fluid, for such valves are old, and a suitable valve device is shown in Patent No. 1,227,173. Furthermore, if the engine is reversible, the passageway 4 may be considered as the inlet and the passageway 3 as the discharge passageway.

An eccentric 5 is fixed to a rotary shaft 6 mounted in the side walls of the cylinder, and this eccentric is surrounded by a piston in the form of a ring P having a tubular extension 7 adapted to receive a pivot pin 8. An abutment head 9 engages the periphery of tubular extension 7. 10 designates screws extending from the abutment head 9 and passing through slots in the tubular extension 7, said screws being screwed into the pivot 8, so as to secure the abutment head to the piston P. The abutment head 9 and the ends of tubular extension 7 engage the flat side walls 2 so as to prevent the free escape of fluid from the inlet port 3 to the discharge port 4. This abutment head 9 is also provided with an arcuate face 11 engaging a correspondingly formed face to prevent leakage of fluid over the top of the piston. An arm 12 extending from the abutment head 9 is mounted on a pivot pin 13 which permits oscillation of the abutment head.

Fluid under pressure is admitted through the inlet port 3 so as to impart a rotary motion to the shaft 6 and eccentric 5 on which the piston P is mounted.

Each flat side face of the annular piston P is provided with an annular groove 14 adapted to receive a packing ring embodying the features of this invention. Each of the sectional packing rings herein shown comprises an endless packing ring member B mounted in an annular grove 14 and extending therefrom to contact with an inner face 2 of the cylinder. Small leaf springs 16 are secured to a ring 17, said springs being located in the annular groove 14 and engaged with the inner side face of the ring member B so as to force the outer side face of said ring member into engagement with the flat face 2 of the cylinder. The inner wall of groove 14 is provided with an annular recess in which the spring-holding ring 17 is removably mounted.

The sectional packing ring also includes a double sealing ring comprising inner and outer ring members 18 and 19 located in the annular grove 14 and interposed between and engaged with the packing ring member B and a wall of the groove 14. Both of the ring members 18 and 19 are resilient, and the ring member 18 is surrounded by the ring member 19. These resilient ring members are provided with separated ends, as shown in Fig. VI. The double sealing ring produced by the ring members 18 and 19 is wedge-shaped in cross-section, as shown by Fig. III, said double ring having side faces which converge from its wide outer circumferential face to its narrow inner circumferential face. As shown by Fig. III, the endless ring member B is provided with an inclined face engaging the corresponding inclines on the double ring 18—19. This double ring tends to contract when the device is in service, thereby serving as a wedge whereby the endless ring B is forced onto the flat face 2, while the converging side faces of the double ring are forced onto their seats. Lateral pressure is thus transmitted through all of the ring members so as to force them onto their seats.

The endless ring B is approximately equal in width to the annular groove 14 in which it is mounted, but in actual practice there will ordinarily be a slight space between the periphery of this endless ring and the adjacent wall of the groove 14. However, fluid entering this groove will act upon the wide circumferential face of the double sealing ring 18—19, and this fluid pressure tending to contract the resilient wedge will cause the several ring members to more firmly engage their seats. It will be observed that the resilient double ring 18—19 is assembled under tension which tends to contract the resilient wedge, and that fluid pressure on the wide circumferential face of this wedge likewise tends to contract the same, so the service conditions will tend to tighten the wedge, instead of loosening the same.

Furthermore, the fluid pressure in the annular groove 14 (Fig. III) tends to force the endless ring member B into engagement with its seat on the flat face 2, so the pressure of any fluid tending to escape between the flat face 2 and the endless ring member is approximately balanced by the fluid pressure in the annular groove 14. Although the fluid pressure on opposite sides of the ring B may be at times approximately balanced, it will be observed that the springs 16 and the contractile ring 18—19 tend to retain the endless ring B in engagement with the flat face 2.

The resilient rings 18—19 are provided with separated ends, as shown in Fig. VI, but the ends of one ring are preferably diametrically opposite to the ends of the other ring, so as to prevent the escape of fluid through this double ring.

From the foregoing it will be understood that the endless ring B is subjected to fluid pressure tending to force it onto the flat wall 2, and that the wedge-like sealing ring 18—19 provides a very effective seal between the endless ring B and the wall of the groove. Any fluid under pressure tending to escape between the endless ring B and the flat face 2 is opposed by the fluid pressure in the annular groove 14, as well as by the pressure of springs 16 and resilient ring members 18—19, the latter being wedged onto their seats by the fluid pressure.

To provide for the free admission of fluid pressure into the annular groove 14, the periphery of the piston P may be drilled to provide inlet ports 20 at opposite sides of the extension 7 on the piston, as shown by Figs. I and III. When the passageway 3 (Fig. I) is utilized as an inlet port, the fluid pressure will enter the inlet ports 20 at the left side of the tubular extension, and when the passageway 4 is used as the inlet passageway, the fluid under pressure will enter the inlet ports 20 at the right side of tubular extension 7. Since the fluid should not be permitted to freely escape from the annular groove 14, the ports 20 may be provided with check valves in the form of leaf springs 21 (Fig. VIII), which permit the fluid to enter the ports 20 at either side of the extension 7, and which prevent the escape of fluid through the ports 20.

The outer face of the endless ring B is provided with an annular groove 22 and transverse ports 23 leading from said groove to the inner face of said ring, so fluid under pressure entering the annular groove 22 will be permitted to pass into the annular groove 14 unless the pressure in said groove is equal to or greater than the fluid tending to flow through the ports 23.

The endless ring B is also provided with an annular groove 24 adapted to receive liquid which will aid in forming a seal between the friction face of ring B and the flat face 2. If the ring is applied to a steam engine, the groove 24 will become filled with water formed by condensation of the steam.

25 designates a resilient retaining ring (Figs. III and VII) whereby outward movement of the sectional packing ring is limited, so as to confine the packing ring in the piston when the latter is outside of the cylinder. This retaining ring 25 is resilient and it is removably mounted in an annular recess formed in the inner circular wall of the groove 14, as shown by Fig. III. In applying the ring 25 to the piston, said ring is expanded and forced into the groove 14, whereupon it contracts into the annular recess in which it is normally seated as shown by Fig. III.

I claim:

1. A packing ring comprising an endless ring member having a friction face on one of its sides, and yielding means associated with said endless ring member to engage said friction face with its seat, said yielding means including a resilient packing ring member whereby lateral pressure is imparted to said endless ring member.

2. A packing ring comprising an endless ring member having a friction face on one of its sides, and yielding means associated with said endless ring member to engage said friction face with its seat, said yielding means including a resilient packing ring member whereby lateral pressure is imparted to said endless ring member, and said resilient packing ring member being wedge-shaped in cross section.

3. A packing ring comprising an endless ring member having a friction face on one of its sides, and yielding means associated with said endless ring member to engage said friction face with its seat, said yielding means including a resilient packing ring member at the other side of said endless ring member, and said resilient packing ring member having converging side faces to provide a circular resilient wedge whereby lateral pressure is transmitted through both of said ring members.

4. A packing ring comprising an endless ring member having a friction face on one of its sides, and yielding means associated with said endless ring member to engage said friction face with its seat, said yielding means including a pair of resilient packing ring members at the other side of said endless ring member, one of said resilient packing ring members being surrounded by and engaged with the other resilient packing ring member, said resilient packing ring members having converging side faces to provide a circular resilient wedge whereby lateral pressure is transmitted through all of said ring members.

5. In an apparatus having a pressure chamber provided with a flat inner face and a piston having a side face provided with an annular groove adjacent to said flat inner face, a packing ring mounted in said groove and comprising an endless ring member having a friction face adapted to engage said flat inner face and yielding means associated with said endless ring member to force said friction face into engagement with said flat inner face.

6. In an apparatus having a pressure chamber provided with a flat inner face and a piston having a side face provided with an annular groove adjacent to said flat inner face, a packing ring mounted in said groove and comprising an endless ring member having a friction face adapted to engage said flat inner face and yielding means associated with said endless ring member to force said friction face into engagement with said flat inner face, said yielding means including a resilient packing ring member interposed between said endless packing ring member and a wall of said groove, said resilient packing ring member being provided with separated ends and converging side faces to form a circular resilient wedge whereby lateral pressure is transmitted to both of said ring members.

7. In an apparatus having a pressure chamber provided with a flat inner face and a piston having a side face provided with an annular groove adjacent to said flat inner face, a packing ring mounted in said groove and comprising an endless ring member having a friction face adapted to engage said flat inner face, said groove being provided with an inlet for the admission of fluid tending to escape from said pressure chamber, so that the fluid pressure tending to force the ring from the groove will be approximately equal to the pressure of fluid tending to escape between said friction face and the flat inner face.

8. In an apparatus having a pressure chamber provided with a flat inner face and a piston having a side face provided with an annular groove adjacent to said flat inner face, a packing ring mounted in said groove and comprising an endless ring member having a friction face adapted to engage said flat inner face, said groove being provided with an inlet for the admission of fluid tending to escape from said pressure chamber, so that the fluid pressure tending to force the ring from the groove will be approximately equal to the pressure of fluid tending to escape between said friction face and the flat inner face, and yielding means tending to retain said friction face in contact with said flat inner face.

9. In an apparatus having a pressure chamber provided with a flat inner face and a piston having a side face provided with an annular groove adjacent to said flat inner face, a packing ring mounted in said groove and comprising an endless ring member having a friction face adapted to engage said flat inner face, said endless ring member being provided with a passageway for the admission of fluid into said groove, so that the fluid pressure tending to force the ring from the groove will be approximately equal to the pressure of fluid tending to escape between said friction face and the flat inner face.

10. In an apparatus having a pressure chamber provided with a flat inner face and a piston having a side face provided with an annular groove adjacent to said flat inner face, a packing ring mounted in said groove and comprising an endless ring member having a friction face adapted to engage said flat inner face, said endless ring member being provided with a passageway for the admission of fluid into said groove, so that the fluid pressure tending to force the ring from the groove will be approximately equal to the pressure of fluid tending to escape between said friction face and the flat inner face, and a resilient packing ring member cooperating with said endless ring member to force said friction face into engagement with said flat inner face.

11. In an apparatus having a pressure chamber provided with a flat inner face and a piston having a side face provided with an annular groove adjacent to said flat inner face, a packing ring mounted in said groove and comprising an endless ring member having a friction face adapted to engage said flat inner face, said piston having a passageway extending from said groove to the fluid-receiving space in said pressure chamber, so that the fluid pressure tending to force the ring from the groove will be approximately equal to the pressure of fluid tending to escape between said friction face and the flat inner face.

12. In an apparatus having a pressure chamber provided with a flat inner face and a piston having a side face provided with an annular groove adjacent to said flat inner face, a packing ring mounted in said groove and comprising an endless ring member having a friction face adapted to engage said flat inner face, said piston having a passageway extending from said groove to the fluid-receiving space in said pressure chamber, so that the fluid pressure tending to force the ring from the groove will be approximately equal to the pressure of fluid tending to escape between said friction face and the flat inner face, and a check valve tending to prevent escape of fluid from said groove to said fluid-receiving space.

13. In an apparatus having a pressure chamber provided with a flat inner face and a piston having a side face provided with an annular groove adjacent to said flat inner face, a packing ring mounted in said groove and comprising an endless ring member having a friction face adapted to engage said flat inner face, said friction face being provided with a groove and said endless ring having transverse ports leading from the last mentioned groove to the first mentioned groove.

14. In an apparatus having a pressure chamber provided with a flat inner face and a piston having a side face provided with an annular groove adjacent to said flat inner face, a packing ring mounted in said groove and comprising an endless ring member having a friction face adapted to engage said flat inner face, and said friction face being provided with a circular liquid-receiving groove wherein an annular body of liquid may be confined between said endless ring and flat inner face.

15. A packing ring comprising an endless ring member having a friction face on one of its sides, yielding means associated with said endless ring member to engage said friction face with its seat, and a retaining ring whereby said endless ring member is secured.

16. In an apparatus having a pressure chamber provided with a flat inner face and a piston having a side face provided with an annular groove adjacent to said flat inner face, a packing ring mounted in said groove and comprising an endless ring member having a friction face adapted to engage said flat inner face, yielding means associated with said endless ring member to force said friction face into engagement with said flat inner face, and a retaining ring removably mounted in said groove to limit the lateral motion of said endless ring member.

17. In an apparatus having a pressure chamber provided with a flat inner face and a piston having a side face provided with an annular groove adjacent to said flat inner face, a packing ring mounted in said groove and having a friction face engaging said flat inner face, said piston having a passageway leading from the fluid-receiving space in said pressure chamber to said groove, and a check valve tending to prevent escape of fluid from said groove to said space.

18. In an apparatus having a pressure chamber provided with a flat inner face and a piston having a side face provided with an annular groove adjacent to said flat inner face, a packing ring mounted in said groove and having a friction face engaging said flat inner face, said piston having peripheral passageways leading from the fluid-receiving space in said passageway to said groove, an abutment extending from the periphery of said piston at a point between said passageways, and check valves tending to prevent discharge of fluid from said groove and through said passageways.

19. A sectional packing ring comprising a ring section having sealing faces at its opposite sides, a resilient ring section having inner and outer circumferential faces one of which is wider than the other, said resilient ring section having converging sealing faces at its opposite sides to provide a resilient wedge, one of the last mentioned sealing faces being engaged with one of the first mentioned sealing faces, and said resilient ring section being under tension tending to force its converging sealing faces onto their seats.

20. A sectional packing ring comprising a ring section having sealing faces at its opposite sides, a resilient ring section having inner and outer circumferential faces one of which is wider than the other, said resilient ring section having converging sealing faces at its opposite sides to provide a resilient wedge, one of the last mentioned sealing faces being engaged with one of the first mentioned sealing faces, said resilient ring section being under tension tending to force its converging sealing faces onto their seats, and the relatively wide circumferential face of said resilient ring section being exposed to receive the pressure of fluid tending to escape between said ring sections.

21. In an apparatus having a pressure chamber and a piston mounted therein, packing ring sections interposed between said piston and pressure chamber, each of said ring sections having sealing faces at its opposite sides and the sealing face at a side of one ring section being engaged with a sealing face at a side of the other ring section, one of said ring sections being resilient and provided with converging side faces to form a circular wedge having inner and outer circumferential faces, one of which is wider than the other, and the relatively wide circumferential face being exposed to the fluid tending to escape from said pressure chamber.

22. In an apparatus having a pressure chamber provided with a flat inner face and a piston having a side face adjacent to said flat inner face, packing ring sections interposed between said piston and the flat inner face of said pressure chamber, each of said ring sections having sealing faces at its opposite sides, the sealing face at a side of one ring section being engaged with said flat inner face of the pressure chamber and the sealing face at the other side of the last mentioned ring section being engaged with a sealing face at a side of the other ring section, one of said ring sections being resilient and exposed to the pressure of fluid tending to escape from said pressure chamber, whereby all of said sealing faces are forced onto their seats.

23. In an apparatus having a pressure chamber provided with a flat inner face and a piston having a side face provided with an annular groove adjacent to said flat inner face, a packing ring section mounted in said annular groove and engaging said flat inner face of the pressure chamber, a second packing ring section interposed between a side wall of said groove and a side face of the first mentioned packing ring section, one of said ring sections being resilient and wedge-shaped in cross-section to provide a resilient wedge whereby lateral pressure may be transmitted to both of said ring sections to force them onto their seats, and said resilient ring section being exposed to receive the pressure of fluid tending to escape from said pressure chamber.

24. An apparatus having a pressure chamber and a piston mounted therein, said piston having a side face adjacent to a wall of said pressure chamber, a packing ring member engaging said wall of the pressure chamber, a second packing ring member interposed between said piston and the first mentioned packing ring member, one of said packing ring members being endless and the other being resilient and provided with separated ends, the resilient packing ring member having a pressure-receiving circumferential face to which pressure may be transmitted to force both packing ring members onto their seats, and said pressure-receiving face being exposed to receive the pressure of fluid tending to escape between said piston and pressure chamber.

25. An apparatus having a pressure chamber and a piston mounted therein, said piston having a side face adjacent to a wall of said pressure chamber, a packing ring member engaging said wall of the pressure chamber, a second packing ring member interposed between said piston and the first mentioned packing ring member, one of said packing ring members being endless and the other being resilient and provided with separated ends, the resilient packing ring member having a pressure-receiving circumferential face to which pressure may be transmitted to force both packing ring members onto their seats, and said pressure-receiving face being exposed to receive the pressure fluid tending to escape between said piston and pressure chamber, the resilient packing ring member being wedge-shaped in cross-section to provide a resilient wedge whereby both packing ring members may be wedged onto their seats, and said resilient packing ring member being exposed to receive the pressure of fluid tending to escape from said pressure chamber.

26. An apparatus having a pressure chamber and a piston mounted therein, said pressure chamber having a flat inner face and said piston having an annular groove adjacent to said flat inner face, an endless packing ring member mounted in said groove and engaging said flat inner face, a resilient packing ring member mounted in said groove and interposed between said endless packing ring member and a wall of said groove, said resilient packing ring member being wedge-shaped in cross-section and provided with separated ends, so as to provide a resilient wedge whereby both packing ring member may be wedged onto their seats, and said resilient packing ring member being exposed to receive the pressure of fluid tending to escape from said pressure chamber, whereby the resilient wedge is acted upon to seat the ring members.

27. An apparatus having a pressure chamber and a piston mounted therein, said pressure chamber having a flat inner face and said piston having an annular groove adjacent to said flat inner face, an endless packing ring member mounted in said groove and engaging said flat inner face, a resilient packing ring member mounted in said groove and interposed between said endless packing ring member and a wall of said groove, said resilient packing ring member being wedge-shaped in cross-section and provided with separated ends, so as to provide a resilient wedge whereby both packing ring members may be wedged onto their seats, said groove having an inlet for the admission of fluid tending to escape from said pressure chamber, and said resilient ring member having a circumferential face exposed to the pressure in said groove, so as to wedge said ring members onto their seats.

28. In a rotary apparatus of the character described having a cylinder provided with a flat inner face and a circular piston having a flat side face adjacent to said flat inner face, said flat side face of the piston being provided with an annular groove, an endless packing ring section mounted in said annular groove and extending therefrom to contact with said flat inner face of the cylinder, and yielding means associated with said endless packing ring section to force it into engagement with said flat inner face of the cylinder, said resilient means including a pair of resilient contractile packing ring sections located in said annular groove and interposed between and engaged with said endless packing ring section and a wall of said annular groove, one of said resilient ring sections being surrounded by and engaged with the other resilient ring section, said resilient ring sections having converging side faces to provide a resilient contractile wedge whereby lateral pressure is transmitted through all of said ring sections, said annular groove having an inlet for the fluid tending to escape from the cylinder and the periphery of the resilient contractile wedge being exposed to receive the fluid pressure, the inner face of said endless ring section being exposed to said fluid pressure in the annular groove whereby said endless ring is forced onto said flat inner face of the cylinder, springs tending to force said endless ring section into engagement with said flat inner face, and a resilient retaining ring removably mounted in said annular groove and cooperating with said endless ring section to retain all of said ring sections in said annular groove.

In testimony that I claim the foregoing I hereunto affix my signature.

GEORGE F. MOORS.